Patented Sept. 22, 1953

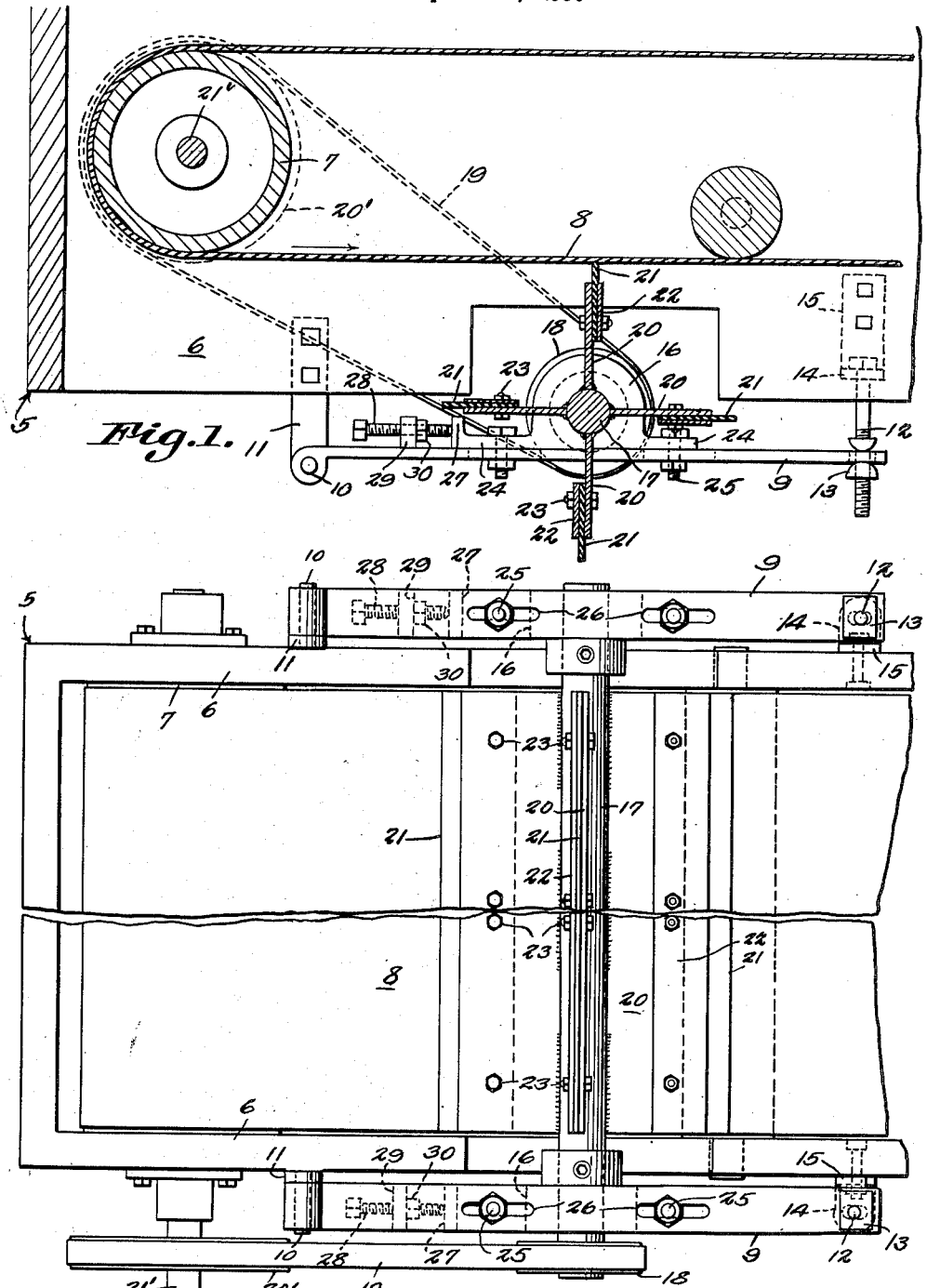

2,652,920

UNITED STATES PATENT OFFICE 2,652,920

CONVEYER BELT CLEANER

Paul E. Bowman, Columbus, Kans.

Application April 27, 1950, Serial No. 158,522

1 Claim. (Cl. 198—230)

This invention relates to conveyor belt cleaners, the primary object of the invention being to provide a cleaner of the rotary type embodying wiping blades, so constructed and arranged that they will contact the lower flight of an endless belt conveyor, cleaning material therefrom, to prevent the material from being carried between the conveyor and its supporting rollers, to foul the conveyor.

Another important object of the invention is to provide a rotary cleaner which may be adjusted with respect to the conveyor, so that it will effectively clean or remove wet or dry material.

Still another object of the invention is to provide means for compensating for wear of the cleaner blades of the apparatus and at the same time adjust the blades so that they will effectively operate with the minimum amount of friction between the blades and conveyor.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings,

Fig. 1 is a longitudinal sectional view through a conveyor illustrating a cleaner, constructed in accordance with the invention as in section, and mounted thereunder.

Fig. 2 is a bottom plan view of one end of the conveyor the cleaner being attached thereto.

Referring to the drawing in detail, the conveyor frame is indicated generally by the reference character 5, and includes side members 6 between which the supporting rollers of a conveyor are mounted, the supporting roller at one end of the conveyor being indicated by the reference character 7.

The conveyor which is in the form of an endless belt, is indicated by the reference character 8, which conveyor may be used in conveying any material such as soft coal or the like, and which frequently collects on the surface of the conveyor, to be carried by the conveyor, onto the supporting rolls of the conveyor, which usually results in fouling or stopping the conveyor.

The cleaner, forming the subject matter of the present invention, embodies spaced arms 9 which arms are pivotally mounted on the rods 10 which are secured in openings formed in the bearing arms 11 that are bolted or otherwise secured to the outer surfaces of the side members 6, as clearly shown by Fig. 1 of the drawing.

These arms 9 are substantially long and are provided with openings adjacent to their free ends, through which the supporting bolts 12 operate, the bolts 12 being provided with curved bearing nuts 13 against which the arms 9 rest. These bolts 12 extend through openings formed in the outwardly extended ends 14 of the arms 15 that are secured to the side members 6, the construction being such that when the nuts 13 are rotated on the threaded portions of the bolts 12, the arms 9 will be adjusted vertically, for purposes to be hereinafter more fully described.

These arms provide supports for the adjustable bearings 16 in which the rotary shaft 17 operates, the rotary shaft 17 extending beyond one side of the frame of the conveyor, where it is supplied with the pulley 18 over which the belt 19 operates, the belt 19 also operating over the pulley 20' mounted on the shaft 21', which constitutes the power shaft that operates the conveyor proper.

Radiating from the shaft 17, and disposed at approximately ninety degree angles with respect to each other, are the metallic blades 20 to which the rubber blades 21 are secured, there being provided bars 22 that are secured against the blades 21 for clamping the blades 21 in position on the metallic blades 20. Bolts 23 extend through the blades 20, and 21 and bars 22, securing the bars 22 and blades 21 in position on the metallic blades 20.

The adjustable bearings 16 are formed with extensions 24 that are provided with openings through which the bolts 25 extend, the bolts 25 also passing through the elongated openings 26, formed in the bearing arms 9, so that the adjustable bearings 16 may be adjusted longitudinally of the arms 9 for tightening the belt 19.

As clearly shown by Fig. 1 of the drawings, one of the extensions of each bearing 16, is formed with an upstanding end 27 against which the adjusting screw 28 moves, the adjusting screw passing through a threaded opening in the lug 29, whereby rotation of the adjusting screw 28 will operate to adjust the bearings 16, longitudinally of their supporting arms. Lock nuts 30 are provided for holding the set screws in their positions of adjustment.

From the foregoing it will be seen that due to the construction shown and described, I have provided a rotary cleaner embodying rubber wiping blades that move in a direction counter to the direction of operation of the conveyor, with the result that material which ordinarily adheres to the under surface of the lower flight of the conveyor, will be wiped therefrom, cleaning the conveyor and preventing the collection of the material on the conveyor to clog and foul the conveyor.

Having thus described the invention, what is claimed is:

The combination with an endless conveyor belt and frame in which the conveyor belt operates, of a conveyor belt cleaner comprising a pair of spaced supporting arms, means pivotally connecting one of the respective ends of the supporting arms to said frame at opposite sides thereof, under the conveyor, oppositely disposed horizontal bearing members mounted on the arms for adjustment longitudinally of said arms, a shaft mounted within said bearing members, supporting blades extending from said shaft, rubber blades mounted on the supporting blades, said rubber blades adapted to wipe the lower flight of the conveyor with which the cleaner is used, and means for rotating said shaft and blades.

PAUL E. BOWMAN.

References Cited in the file of this patent

UNITED STATES PATENTS

| Number | Name | Date |
|---|---|---|
| 567,140 | Hooper | Sept. 8, 1896 |
| 1,239,066 | Winters | Sept. 4, 1917 |
| 1,299,324 | Goodykoontz | Apr. 1, 1919 |
| 1,330,967 | Winters | Feb. 17, 1920 |
| 1,331,484 | Carr | Feb. 24, 1920 |
| 1,431,770 | Ayres | Oct. 10, 1922 |